Oct. 1, 1940.        R. ERBAN        2,216,191
TRANSMISSION DEVICE
Original Filed Jan. 24, 1934

INVENTOR.
Richard Erban
BY Ramsey, Kent, Chisholm & Lutz
his ATTORNEYS.

Patented Oct. 1, 1940

2,216,191

UNITED STATES PATENT OFFICE 2,216,191

TRANSMISSION DEVICE

Richard Erban, New York, N. Y., assignor to Erban Patents Corporation, a corporation of New York Original application January 24, 1934, Serial No. 708,024. Divided and this application July 7, 1938, Serial No. 217,908

14 Claims. (Cl. 74—208)

The present invention was disclosed in my application Serial No. 708,024, filed January 24, 1934, now United States Patent 2,148,857, patented February 28, 1939, in which division was required, and the present application is a division of my said prior application Serial No. 708,024, and relates to torque loaders which are well-known in the art of friction transmission construction.

One of the problems in connection with variable speed friction transmissions is the establishment of a correct torque load on the driving elements. Where the torque load is directly proportional to the torque it may be correct for a definite speed ratio of transmission, and where the speed ratio of transmission changes the torque load will not be correct. It will either be too little or too much, dependent on the change. It is customary in designing torque loaders having a straight line characteristic to design the torque loader in such manner as to produce sufficient pressure to take care of minimum conditions. Then when the speed ratio is changed a situation will be reached wherein the pressure produced by the torque loader is far greater than is necessary for the particular conditions. The present invention is designed to produce a variable ratio between the torque and the pressure produced so that the torque loader will produce correct pressures on the transmission elements throughout the range of speed ratios for which the transmission is designed.

More specifically the torque loader comprising the present invention is one wherein the torque effective on the torque loader is transmitted through a leverage system whereby the torque effective upon the torque loader elements may be increased or decreased dependent upon the design of the leverage system.

A still more specific characteristic of the present invention is a torque loader utilizing a leverage system through which the torque is operative on the torque loader to produce the pressure, and wherein the effective length of the arms of a lever may be varied. This variation of the effective lengths of the arms of the torque transmitting lever may be accomplished by moving the pivot of the lever, whereby, if the lever is one of first class, the arm on one side of the pivot is shortened and the arm on the other side of the pivot is lengthened the same amount.

The variation in this pivot point may be controlled in several ways, as, for example, a connection may be provided to the speed ratio change mechanism of the transmission so that when the speed ratio of the transmission is changed the pivot point of the torque control lever is shifted and the torque effective on the torque loader elements is changed in such manner as to produce the correct pressure for the particular speed ratio setting of the transmission. This pivot point may also be controlled automatically by the transmission itself so as to maintain a condition whereby the friction elements of the transmission do not slip relatively to each other. As, for example, the connections may be such as to vary the pivot point to render the torque more effective on the torque loader when the "creep" between the transmission elements exceeds a pre-determined amount.

Other and further characteristics of this invention will in part be pointed out in the specification hereinafter following, by reference to the accompanying drawing wherein like characters are used to represent like parts throughout the several figures thereof.

Figure 3:
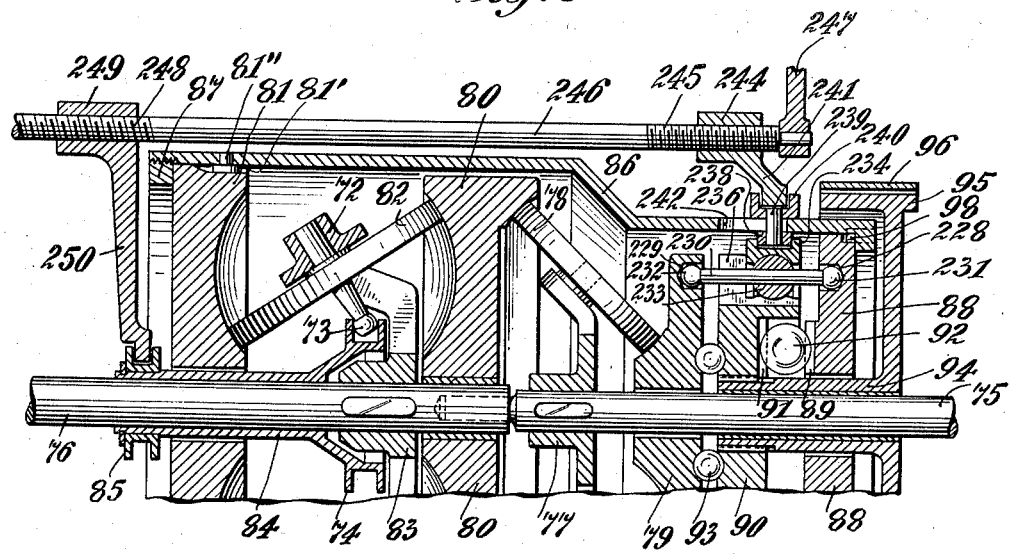
Fig. 3 illustrates more fully a friction transmission embodying a form of the present invention, and shows certain of the parts in section.

Referring to Fig. 3, there is provided a drive shaft 75 to which is secured the roller support 77, on which are rotatably mounted a plurality of (non-adjustable) rollers 78. These move, on the one hand, on the race-ring 79, freely rotatable on shaft 75, and, on the other hand, on a track of the race-ring 80, rotatably mounted on the driven shaft 76. To the latter is secured the roller support 83 of the adjustable or tiltable rollers 82 which are mounted in a tiltable yoke 72, and the shaft 76 is rotated by the rotation of said support 83. The adjustment of the rollers 82, for the purpose of varying the ratio of transmission, can be effected by a means of well-known construction comprising a collar 74 embracing a ball head 73 carried by a sleeve 84 provided with a grooved collar 85, as indicated in Fig. 3. The rollers 82 move, on the one hand, on the race ring 80 and, on the other hand, on the race ring 81, which is so connected with the cylindrical casing 86 by a groove 81' and stud 81'' so that these two parts are coupled to rotate together. The race ring 81 is slightly axially movable so that by the nut 87 it can be adjusted within narrow limits.

When the race-ring 79 is held against rotation and the drive-shaft 75 is rotated, the race-ring 80 is rotated by the friction rollers 78 at greater speed than the shaft 75.

Now, if also the race-ring 81 is held against rotation the roller-support 83 and thereby also the driven shaft 76 are rotated, because the adjustable rollers 82 move like planetary gears. Depending on the position of the rollers 82, the number of revolutions of the roller support 83 and of the shaft 76 varies. In the position of the rollers 82 shown in Fig. 3, the number of revolutions is greatest, and substantially like the number of revolutions of the driving shaft 75. If the rollers 82 are moved clockwise from the position shown, the number of revolutions of shaft 76 becomes smaller. The moment of reaction of the gear occurs at two parts of the gear, that is to say, at the race-ring 81 and the race-ring 79. The moment of reaction of the race-ring 79 acts in the same direction as the driving moment, while the moment of reaction of the race-ring 81 is opposite to that direction. Now, if the gear runs with a ratio of transmission of 1:1, the two moments of reaction are equally large, as will appear from Fig. 3, if one considers that in that case the torques at the drive shaft 75 and at the driven shaft 76 are equal to each other. However, since, as has already been stated, the moments of reaction of the rings 81 and 79 have opposite direction, that is to say, tend to rotate said rings in opposite direction, the two moments of reaction balance each other, and the total moment of reaction of the gear is nil. for the other positions of the adjustable rollers 82 the moment of reaction of the race-ring 81 predominates, so that there remains a positive total moment of reaction, the term "positive" being used for a reaction moment which has the opposite direction of the driving torque. Now, if the axial force of pressure between the rollers 82 and the race-rings 80, 81 in every position of the rollers 82, has a value, which as nearly as possible, approaches the required value, the axial force exerted on the gear must be proportional to the torque of shaft 76. A control of the axial force proportional to the torque of one of the two rings would result in considerably poorer conditions and a great excess of load, as has been fully explained in my copending application, Serial No. 679,843, filed on July 11, 1933. However, the sum of the torques of the race-rings 80, 81 can be used for adjustment, since said sum must always be equal to the torque of the roller carrier 83.

In the embodiment shown, the torque of the race-ring 81 is transmitted in a simple manner by means of a pressure device now to be described. At the right hand end of the cylindrical casing 86 there is secured a collar 88, which is provided with inclined faces 89. Another collar 90 provided with similar inclined faces 91 bears, by means of balls 93, against the race-ring 79, and is so disposed that space is provided for the balls 92 between the inclined faces 89, 91. Now, if the collar 90 is prevented from rotation, but is allowed to move axially, there will be produced in the pressure device 89, 92, and 91 an axial force when the collar 88 rotates relatively to the collar 90. The collar 90 can be held against rotation, for example, by a hollow shaft 94, which on its periphery carries a brake-drum 95. The said drum 95 can be prevented from rotation by a brake band 96. The arrangement may be such that the drum 95 is prevented from rotation in one direction only, but is free to rotate in the other direction.

It has been shown supra that the correct axial force would be produced, if there were transmitted by means of a pressure device a torque, corresponding to the algebraic sum of the torques of the two race-rings 80 and 81. Now, the moment of reaction of the ring 79 is at a constant ratio to the torque of the ring 80. It is decreased only in proportion to the sliding radius of the rollers 78 on the two rings 80 and 79 and moreover, as has been stated above, has the opposite direction of the torque of race-ring 81. Therefore, the torque of the ring 79 would have to be decreased in proportion to the transmission effected by the rollers 78, and reversed so that together with the torque of the ring 81 it would result in the required total output. To this end there is provided, in Fig. 3, rods 230 (one only being shown) which terminate in spherical ends 231 and 232. These spherical ends 231 and 232 are mounted in cylindrical openings 228 and 229 in the collars 88 and 79 respectively. The rods 230 are mounted to slide through pivot balls 233 that are mounted to rotate in slidable blocks 234 that are slidably mounted in guide-ways 236 provided in the collar 90. A suitable connection, comprising a roller 238 and a pin 239, connects the slidable blocks 234 with a control collar 240 that is provided with a groove in which a control arm 241 extends. An opening 242 is provided in the casing 86 to permit suitable movement for pin 239. It is to be understood that these parts are so connected as to be freely movable to accomplish the movements required. The control arm 242 may extend from a sleeve nut 244 that is mounted on the screw threaded part 245 of the control shaft 246 which may have one end resting in bearing frame member 247. This control shaft 246 is also screw threaded at 248 to carry a screw threaded sleeve 249 from which the speed control arm 250 extends into the speed ratio control collar 85. The screw threaded portions 245 and 248 on the control shaft 246 are preferably of different pitch, and with the part 245 having more threads to the inch than the part 248, so that the sleeve 244 will have less linear movement than the sleeve 249 for a revolution of the control shaft 246.

From the foregoing it will be observed that when the control shaft 246 is rotated to oscillate the tiltable rollers 82 to change the speed ratio that the control arm 242 shifts the pivot balls 233 along the rods 230 and thus change the pivot points of these rods, to thereby change the effective torque operating to cause the faces 89 and 91 to apply pressure on the balls 92. This effective torque is so changed as to apply the proper torque load for each speed ratio of the transmission.

Figure 1:
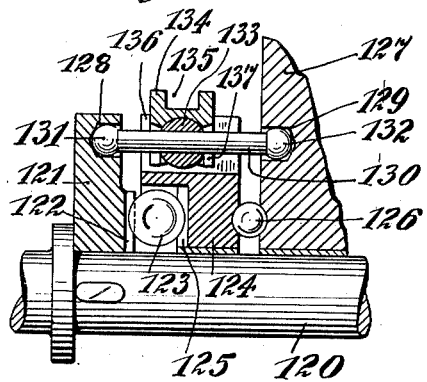
Fig. 1 is a detail view illustrating a simple form of the present invention showing certain of the parts in section.
Figure 2:
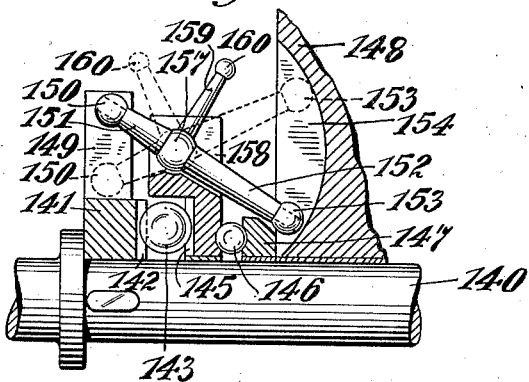
Fig. 2 is a view illustrating a modified form wherein the effective length of the leverage system is obtained by changing the effective radii of the lever on the system.

In Fig. 1 there is secured to the shaft 120 the ring 121, which on its right hand side is provided with inclined faces 122. Between these and the opposed inclined faces 125 provided on the ring 124 rotatably and axially movably mounted on shaft 120 there are disposed balls 123. The ring 124 bears, by means of a set of balls 126, against the race-ring 127, which also is rotatably and axially movably mounted on the shaft 120. The ring 121, similar to the element 22 in Fig. 2, is provided near its periphery with a plurality of cavities 128, and likewise the race-ring 127 is provided with the same number of oppositely disposed cavities 129. The ring 124, along its periphery, is provided with a like number of radial slots 136, wherein balls can slide which are longitudinally movably mounted on rods 130. The latter are journalled with their spherically shaped ends 131 and 132 in the above said cavities 128 and 129. All the balls 133 are so held by claws 137 of an annular element 134 in a definite position that they occupy on their rods 130, with respect to the spherically shaped heads 131 and 132, the same position. The annulus 134 is formed with a groove 135 permitting it during the rotation to be displaced by a fork (not shown). This displacement can either take place together with the adjusting movement of the speed control, or may also be made to depend on other factors.

Instead of the transmission ratio being varied by a displacement of the fulcrum of the transmission levers, said variation can also be effected by other expedients, for instance, the displacement of said levers about their fulcrums. The transmission ratio is then varied by varying the distance of the joints of the levers from the axis of the gear shaft, while the leverage remains unchanged. Such a construction is shown in Fig. 2. On the shaft 140 is secured the ring 141, which, by the pressure device 142, 143 and 145, is operatively connected with the ring 144. The latter being loosely mounted on the shaft 140 bears by means of a series of balls 146 against the ring 147 which in turn bears against the race element 148. Also, the ring 147 and the element 148 are loosely mounted on the shaft 140. The ring 141 is provided along its periphery with radial slots 149. An equal number of slots 154 is provided in the race element 148. Also the ring 144 is provided with recesses 158 which are situated between the slots 149 and 154. A plurality of two-arm levers 151, 152 and 159 are mounted with their intermediate ball-shaped pivots 157 in the recesses 158 of the ring 144 in such a way that they can both rock in an axial plane and also execute slight turning movements relative thereto. The two arms 151 and 152 of each of the two-arm levers are equipped with rotatable balls 150 and 153, adapted to move in the slots 149 and 154 respectively. Each two-arm lever is, moreover, provided with an arm 159, which by means of a joint 160 permits the two-arm lever to be rocked about the fulcrum 157. The position of the two-arm levers shown in full lines in Fig. 10 results in the greatest transmission between the race element 148 and the pressure device 142 143 and 145, since the distance of the ball 153 from the axis of the gear is very small, so that a large peripheral force is effected. In the position of the two-arm lever shown by the broken lines, there results the smallest peripheral force and consequently, the smallest axial force produced by the pressure device. It is understood, of course, that when a plurality of two-arm levers are used, all the joints 160 must be displaced simultaneously.

Instead of the above described mechanical transmissions (levers, toothed sectors, etc.) there can be used of course, also other types of transmissions, e. g. hydraulic transmissions, without any departure from the principle of the invention herein involved. Therefore, the constructions herein described and shown are only to be considered as illustrations of the fundamental arrangements, since it is impossible to describe all the combinations and uses of all the equivalent transmission devices at present known.

What I claim is:

1. In a device of the class described, two relatively rotatable members, a pressure device operable to produce axial pressure in response to the torque transmitted by the said two members, means to multiply the axial pressure produced by the said pressure device at a given torque, the ratio of multiplication being variable, and means to vary said ratio of multiplication.

2. In a device of the class described, two relatively rotatable members, a pressure device operable to produce axial pressure in response to the torque transmitted by the said two members, means including a lever to multiply the axial pressure produced by the said pressure device at a given torque, the ratio of multiplication of said lever being variable, and means to vary said ratio of multiplication.

3. In a device of the class described, two relatively rotatable members, a pressure device operable to produce axial pressure in response to the torque transmitted by the said two members, and a lever system having a variable fulcrum to multiply the axial pressure in predetermined ratios to the torque being transmitted depending upon the position of the fulcrum.

4. In a device of the class described, two relatively rotatable members, a pressure device operable to produce axial pressure in response to the torque transmitted by the said two members, a shaft, and a lever adjustable to different angles to the said shaft to multiply the axial pressure in predetermined ratios to the torque being transmitted depending upon the adjusted angle.

5. In a device of the class described, two relatively rotatable members, a pressure device operable to produce axial pressure in response to the torque transmitted by the two said members, slidable means to modify in predetermined and adjustable ratios the axial pressure produced by the said pressure device at a given torque, and means capable of operation at all times to effect a change of said ratios.

6. In combination with a power transmission system in which power is transmitted from a driving to a driven element by the adhesive driving contact of races with rollers therebetween, a pressure device for maintaining the adhesive driving contact of the rollers with the races, means for receiving and modifying at least one of the torques passing through the system according to a predetermined law and for applying said modified torques to said pressure device, said modification taking place according to a predetermined law, and control means being adjustable to change said law.

7. In combination with a power transmission system in which power is transmitted from a driving to a driven element by the adhesive driving contact of races with rollers therebetween, a pressure device for maintaining the adhesive driving contact of the rollers with the races, and means for receiving at least one of the torques passing through the system, said means comprising a lever having a movable fulcrum for multiplying at a variable ratio the received torque and applying the same in multiplied form to said pressure device.

8. In combination with a power transmission system in which power is transmitted from a driving to a driven element by the adhesive driving contact of races with rollers therebetween, a pressure device for maintaining the adhesive driving contact of the rollers with the races, means for receiving a torque passing through the system, said means comprising a mechanism for modifying the torque in a predetermined ratio and for applying it in said modified form to said pressure device, and means operable to vary the said predetermined ratio.

9. In combination with a power transmission system in which power is transmitted from a driving to a driven element by the adhesive driving contact of races with rollers therebetween, a pressure device for maintaining the adhesive driving contact of the rollers with the races, means for receiving a plurality of torques passing through the system, said means comprising a lever having a movable fulcrum for combining and modifying said torques, and applying the same in such combined and modified form to said pressure device, and means for changing the effective leverage of said first mentioned means.

10. In a device of the class described, two relatively rotating members, a third rotatable member intermediate the two members, a pressure device between the said intermediate member and one of the said two rotatable members, and a lever fulcrumed on the said intermediate member having its ends operatively connected to each of the two said rotatable members, the lever arms of the said lever being such that the axial pressure produced by the said pressure device will be increased at a given torque, the fulcrum of the said intermediate member being adjustable to vary the lever arms of the said lever so as to increase the axial pressure in predetermined ratios to a given torque.

11. In a device of the class described, two relatively rotatable members, a third rotatable member intermediate the two said members, a pressure device between the said intermediate member and one of the said two rotatable members, and a lever fulcrumed on the said intermediate member having its ends operatively connected to each of the two said rotatable members, the lever arms of the said lever being such that the axial pressure produced by the said pressure device will be increased at a given torque, said lever being mounted so that it may be adjustably tilted on its fulcrum on the said intermediate member so as to increase the axial pressure in predetermined ratios to a given torque.

12. In a device of the class described, two coaxial relatively rotatable members, a pressure device operable to produce axial pressure in response to the torque transmitted by the said two members, means including a lever having a shiftable fulcrum to modify the axial pressure produced by the said pressure device.

13. In a variable speed friction transmission, two coaxial relatively rotatable members, a pressure device operable to produce axial pressure in response to the torque transmitted by the said two members, means including a lever to modify the axial pressure produced by the said pressure device, a movable fulcrum for said lever, and means to change the speed ratio of said transmission and to move said fulcrum.

14. In a device of the class described, two coaxial relatively rotatable members, a pressure device operable to produce axial pressure in response to the torque transmitted by the said two members, and means including a lever to multiply the axial pressure produced by the said pressure device, the respective points of application of said lever means to said two members being axially displaced and at different radial distances from the axis of rotation of said members.

RICHARD ERBAN.